Figure 1:
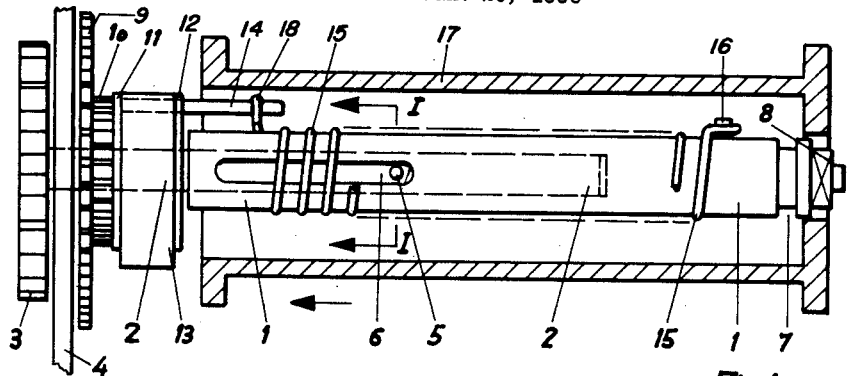

June 14, 1960  R. STEINECK  2,940,682
SPRING MECHANISM FOR AUTOMATICALLY TRANSPORTING ROLL FILMS
Filed Jan. 25, 1956

*Rudolf Steineck*
INVENTOR.

United States Patent Office 2,940,682
Patented June 14, 1960

2,940,682

SPRING MECHANISM FOR AUTOMATICALLY TRANSPORTING ROLL FILMS

Rudolf Steineck, Villa Violetta, Lugano-Pregassona, Switzerland

Filed Jan. 25, 1956, Ser. No. 561,380

Claims priority, application Germany Feb. 1, 1955

4 Claims. (Cl. 242—71.3)

In the usual roll-film camerae it is necessary to transport the film by hand after each exposure. This is necessary especially in connection with films of small size, i.e. films of a width of 35 mm. Mostly said transport means for the film are coupled with the shutter mechanism of the camera in such a manner that before each exposure one transport is performed. In connection with this, a blocking of the objective shutter is possible which prevents a double exposure.

Furthermore, it has been tried to connect the winding-up spool of a roll of film with a spring mechanism which permits the storage of a large mechanical power. By this means it is possible to perform a certain number of exposures with an automatic film transport before or after each exposure, i.e. without any film movement by hand. In this case it is only necessary for each exposure to actuate the shutter releasing means coupled with the film transport means in such a manner that the roll-film is transported by the spring along the width of one image.

It is difficult to realize a stretchable spring mechanism for transporting a roll film. Of course such spring mechanism is preferably needed for camerae of small size. However, just in case there is but a small space it is difficult to arrange a mechanism of the kind of a spring-driven clock work in the camera.

The object of the present invention consists in a spring mechanism for transporting roll films rendering it possible to fully utilize the present space and, thus, to design this arrangement in such a small size that it is applicable in connection with small camerae, e.g. secret camera or bracelet camerae.

According to the present invention, a spring-tensioned film take-up device for a photographic camera having a spring-actuated hollow film spool adapted to receive one end of the film comprises in combination the following features: A shaft arranged in the axis of said spool, one end of said shaft being rotatably secured on the camera and loosely surrounded by said hollow film spool, the other end of said shaft being connected with a milled take-up knob arranged on the outer surface of the case of said camera, a helical film take-up spring surrounding said shaft, one end of said spring being fastened on said shaft near its end which is rotatably secured on the camera, a drum-shaped member having an elastic peripheral surface and being loosely and coaxially arranged on the end of said shaft lying near said milled knob, a tooth wheel loosely and coaxially arranged on said shaft and rigidly connected with a wall of said drum-shaped member, a rod fastened on said drum-shaped member and arranged parallel to said shaft, the other end of said helical spring being fastened loosely and shiftably along said rod, and one end of said hollow film spool being frictionally coupled with the elastic peripheral surface of said drum-shaped member. This helical spring, the length of which nearly corresponds with the length of the rolling-up film spool may be manufactured of a spring material, e.g. a steel wire, in such a manner that it is possible to store a mechanical power which transports a roll film along 10, 20 or more single images of 14 x 20 mm. size in a small camera.

The rolling-up film spool may be disengaged from the said shaft by hand, in an axial direction in order to disconnect said drum-shaped carrier from said film spool.

Figure 2:
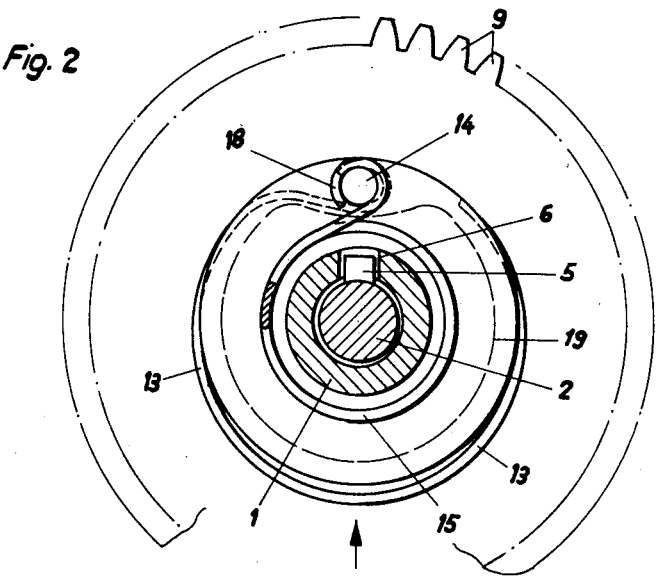
Figure 3:
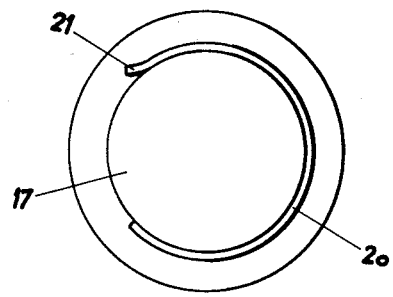

Referring to the drawing:

Fig. 1 represents a side-view of the spring mechanism showing a rolling-up film spool intersected along its axis, Fig. 2 is a sectional view taken along line I—I of Fig. 1, in greater size than in Fig. 1, Fig. 3 is a detail of the mechanism, in the size of Fig. 2.

According to Figures 1 and 2, 1 is shaft provided for winding-up the spring mechanism. Shaft 1 is hollow and contains, for the greatest part of its length, a second shaft 2 connected with a milled knob 3. This knob 3 is mounted on the other side of the winding-up mechanism at the outer surface of the camera case 4 (Fig. 1). The shaft 2 is axially shiftable relatively to the shaft 1 in such a manner that for winding-up, the milled knob 3 can be drawn axially outwardly, thus rendering it possible to grasp and to turn said knob 3 by hand. The shafts 1 and 2 are rotatably coupled with each other by a short radial pin 5 which is axially movable in a slot 6 provided in the wall of the hollow shaft 1 parallel to its axis. The position of shafts 1 and 2, pin 5 and slot 6 are best seen in Fig. 2.

The shaft 1 has, on its right end in Fig. 1, a groove 7 carrying a cotter-shaped spring ring (not shown), axially fixing the position of shaft 1, if this end of shaft 1 is held by means of an opening in another camera wall (not shown) which is arranged parallel to the part 4 of the camera wall on the left side of Fig. 1. Within this right camera wall a square 8 is arranged which carries a blocking-wheel, the function of which is not of importance for the present invention. On the left end of the shaft 2, two additional toothed wheels 9 and 10 are arranged which serve for coupling the film moving means with other parts of the camera, especially with the shutter mechanism or with the brake mechanism, during the wind-off movement of the spring.

The toothed wheels 9 and 10 are loosely arranged on shaft 2, but rigidly coupled with a drum-shaped member 11, 12, 13, 19 which is also loosely and rotatably mounted on the shaft 2. This drum-shaped member contains two walls 11 and 12, and a strip spring 13 surrounding said drum nearly along its entire circumference, as seen e.g. in Fig. 2. One end of this strip spring 13, the right one in Fig. 2, is arranged loosely and somewhat shiftable on a cylindrical part 19 of the drum-shaped member; the other end of strip spring 13 is mounted on a rod 14 (see Figures 1 and 2), in such a manner that the end of the strip spring 13, as represented by dotted lines in Fig. 2, is led from the inside to said rod 14 and surrounds said rod 14; it may be fixed on the rod 14 by soldering or welding. The periphery of the strip spring 13 is somewhat larger than the periphery of the walls 11 and 12, if a winding-up film spool 17 is not mounted on drum 11, 12, as is seen from the lower part of the spring 13 in Figures 1 and 2.

The rod 14 which connects the two walls 11 and 12 of the drum-shaped member with each other and which is arranged parallel to the main axis of the helical spring serves for winding the mechanism, and extends beyond the outer surface of wall 12 as seen in Fig. 1. It serves for mounting a cylindric spiral spring 15 consisting of a strong steel wire surrounding the shaft 1. By reason of simplification only the left and the right end of said spring 15 are shown in Fig. 1. The right end is mounted on a short axial pin 16 arranged on the outer surface of shaft 1. The left end of spring 15 is mounted on the rod 14 by forming a loop 18 loosely surrounding and axially shiftable on said rod 14. By this arrangement the left end 18 of spring 15 remains engaged with the rod 14 and with member 11, 12, 13 when the axial length of spring 15 varies by being wound or unwound.

The rolling-up film spool 17 of cylindrical shape is, for better understanding, not represented in its normal position, but somewhat shifted to the right side. Its left end in the drawing is opened, its right end is closed with exception of a small opening corresponding with the diameter of shaft 1. The spool 17 is mounted by a movement in an axial direction. See the arrow at the bottom of Fig. 1. During this movement, the strip spring 13 is pressed into the inner space of the drum walls 11, 12, see the short vertical arrow in Fig. 2, until the periphery of strip spring 13 has become smaller than the periphery of drum walls 11, 12. Then, the spool 17 can be shifted to the left side over the parts 11, 12, 13 until the left flange of the spool 17 touches the toothed wheel 9. In this position the right end of the hollow shaft 1 juts out over the outer surface of the spool 17 enabling a spring ring to be mounted on the groove 7 on shaft 1. In this state the strip spring 13 is pressed toward the inner wall surface of the spool 17 in such a manner that a sufficient power transmission is effected by the friction between spring 13 and spool 17.

When the mechanism has been mounted in the described manner and arranged in the camera case, the end of a roll of film drawn from a storage film spool is connected with the spool 17. For this purpose, as seen in Fig. 3, a cylindrical leaf spring 20 is mountable on the outer surface of spool 17 surrounding it in an amount of about three quarters of its circumference. One end of this cylindrical leaf spring 20 the axial length of which may be somewhat smaller than the length of spool 17, is bent up as shown at 21 and, thus, the film end can be introduced for some millimeters and fixed between the spool 17 and the cylindrical leaf spring 20.

The design of the invention as described and shown may be varied in some features. For instance, the strip spring 13 may be replaced by a friction layer arranged on the outer surface of drum wall 19 (see Fig. 2) and consisting of rubber or felt.

A blocking mechanism for the wind-off movement of the stretched spring 15 may be designed in such a manner that one of the toothed wheels mounted on shaft 2 is provided with saw teeth pressing towards a pawl as being known per se. This may be achieved by the toothed wheel 9 which is connected with the shutter releasing means of the camera in such a manner that the transport movement in the amount of a width of one image is released when the shutter knob has been pushed.

What is claimed is:

1. A spring tensioned film take-up device in a photographic camera having a spring actuated hollow film spool adapted to receive one end of the film to be wound-up on said spool, comprising in combination a shaft arranged in the axis of said spool, one end of said shaft being rotatably secured on the camera and loosely surrounded by said hollow film spool, the other end of said shaft being connected with a milled take-up knob arranged on the outer surface of the case of said camera, a helical film take-up spring surrounding said shaft, one end of said spring being fastened on said shaft near its end which is rotatably secured on the camera, a drum-shaped member having an elastic peripheral surface and being loosely and coaxially arranged on the end of said shaft lying near said milled knob, a tooth wheel loosely and coaxially arranged on said shaft and rigidly connected with a wall of said drum-shaped member, a rod fastened on said drum-shaped member and arranged parallel to said shaft, the other end of said helical spring being fastened loosely and shiftably along said rod, and one end of said hollow film spool being frictionally coupled with the elastic peripheral surface of said drum-shaped member.

2. In a spring tensioned film take-up device according to claim 1, said shaft being composed of two parts, the first of which is designed hollow and contains a narrow slot arranged in the direction of its axis, the second part being of smaller diameter than the inner diameter of said first-mentioned part and projecting into the interior of said first part, and carrying a radially arranged pin which engages with said slot.

3. In a spring tensioned film take-up device according to claim 2, said second part of said shaft being connected with said milled knob.

4. In a spring tensioned film take-up device according to claim 1, the elastic peripheral surface of said drum-shaped member consisting in a peripheral strip spring, one end of which is fastened on a part of said rod connecting the two side walls of said drum-shaped member with each other.

References Cited in the file of this patent

UNITED STATES PATENTS

| | | |
|---|---|---|
| 1,195,076 | Osteen | Aug. 15, 1916 |
| 1,249,941 | Feild | Dec. 11, 1917 |
| 1,258,387 | Bausch | Mar. 5, 1918 |
| 1,331,849 | Gordon | Feb. 24, 1920 |
| 1,628,580 | De Haes | May 10, 1927 |
| 2,704,969 | Mische | Mar. 29, 1955 |